United States Patent [19]

Ortolano

[11] Patent Number: 4,776,764

[45] Date of Patent: Oct. 11, 1988

[54] STRUCTURE FOR AN AXIAL FLOW ELASTIC FLUID UTILIZING MACHINE

[76] Inventor: Ralph J. Ortolano, 3776 Coolheights Dr., Ranchos Palos Verdes, Calif. 90274

[21] Appl. No.: 33,230

[22] Filed: Apr. 2, 1987

[51] Int. Cl.[4] ................................................ F03B 3/12
[52] U.S. Cl. ........................... 416/196 R; 29/156.8 R; 416/190
[58] Field of Search ............... 416/190, 191, 194, 195, 416/196 R, 500; 29/156.8 R

[56] References Cited

U.S. PATENT DOCUMENTS

| | | |
|---|---|---|
| 3,279,571 | 10/1966 | Ortolano . |
| 3,417,964 | 12/1968 | Ortolano . |
| 3,588,278 | 6/1971 | Ortolano . |
| 3,588,279 | 6/1971 | McGinnis ............................ 416/191 |
| 3,606,578 | 9/1971 | Ortolano . |
| 3,702,221 | 11/1972 | Ortolano . |
| 4,191,508 | 3/1980 | Kuroda et al. ...................... 416/190 |
| 4,257,742 | 3/1981 | Ogata et al. ........................ 416/190 |
| 4,386,887 | 6/1983 | Ortolano . |
| 4,643,645 | 2/1987 | Robbins et al. ..................... 416/190 |
| 4,662,824 | 5/1987 | Ortolano . |

OTHER PUBLICATIONS

"Long Arc Shrouding-A Reliability Improvement for Untuned Steam Turbine Blading", Ortolano et al., *Journal of Engineering for Power*, Jul. 1981, vol. 103, pp. 522–531.

Primary Examiner—Larry I. Schwartz
Attorney, Agent, or Firm—Sheldon & Mak

[57] ABSTRACT

An improved bladed rotor structure for an axial structure for a turbine which is easy to disassemble and produces high damping. Coupling members are located between adjacent blade ends to couple adjacent blades together. Anchoring elements affix adjacent blades with the coupling members which are non-rightangular parallelogram-shaped blocks.

30 Claims, 3 Drawing Sheets

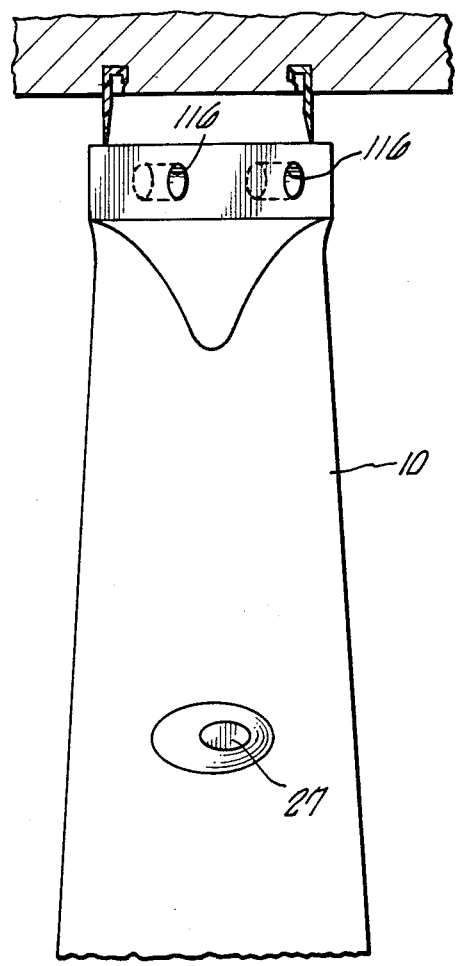
FIG_2
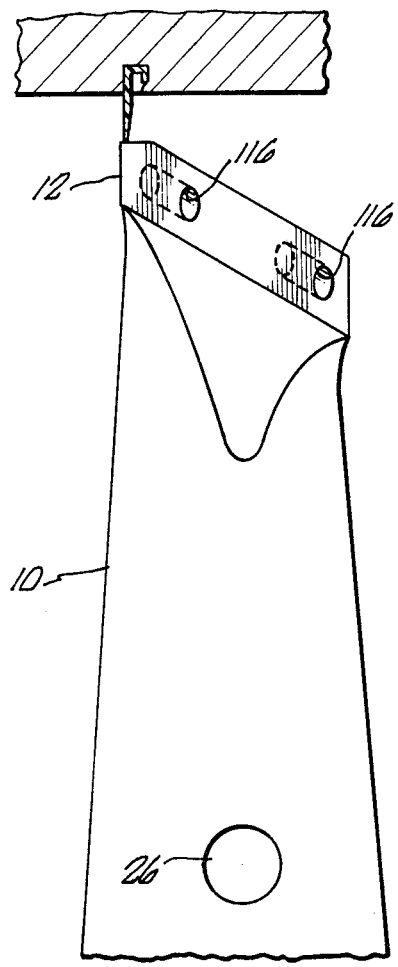
FIG_3
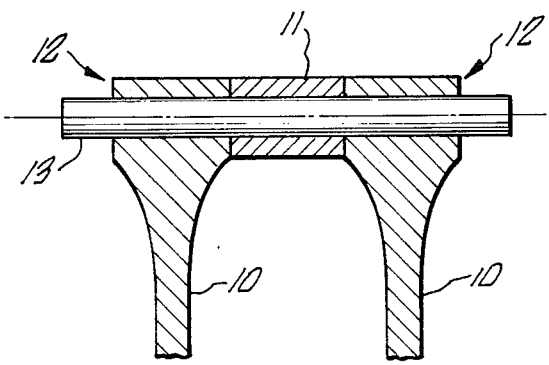
FIG_4

STRUCTURE FOR AN AXIAL FLOW ELASTIC FLUID UTILIZING MACHINE

BACKGROUND

This invention relates to a rotor structure for an axial flow elastic fluid-utilizing machine such as a turbine. In particular, it relates to coupling the radially-extending blades carried by the rotor spindle in a manner where the blades can be easily disassembled and the tips or ends of the blades protected.

A variety of blade structures for turbines and compressors are known and a variety of techniques for minimizing vibrative stresses in blade strutures have been developed.

A major cause of turbine blade failure is high amplitude vibration in one or more of the natural modes of a turbine group leading to high cyclical fatigue crack initiation and propogation, and in some cases, loss of a blade. Different blade designs to avoid problems of vibration at different frequencies have addressed some of the problems. Blading structures are either freestanding designs or grouped in short arcs or long arcs by shrouds. Generally, a continuously coupled structure provides a blade performance which is superior to short arc groups and free-standing designs.

Examples of different blade structures which are known are those in U.S. Pat. Nos. 3,279,751; 3,588,278; 3,417,964; 3,606,578; 3,702,221, and 4,386,887, and U.S. patent application Ser. No. 668,160, filed Nov. 5, 1984 and U.S. patent application Ser. No. 656,187, filed Oct. 1, 1984; and in the transaction of the ASME Journal of Engineering for Power, Volume 103, PP 522–531, July 1981, Long Arc Shrouding—A Reliability Improvement for Untuned Steam Turbine Blading, "Ortolano, Et Al". All these references are incorporated by reference herein.

Although the continuous coupled or tie arrangement is advantageous, over the short arc and free-standing designs, one notable drawback to many of the continuous tie arrangements is the inability to disassemble the row of blades for inspection or repairs. Also, where continuous ties or free-standing blades are reasonably easy to disassemble, another problem that exists is that there is no protection for the end or tip of the blade. In cases where the blades are longer the feature of tip protection is important to prevent strumming and to reduce tip losses.

In view of this, an object of the invention is to provide a rotor structure which has the advantage of a substantially continuously tied or coupled blading structure or permits for long arc groups in a manner to suppress tangential and axial modes of vibration and yet permit for the relatively easy disassembly of the blades and also reduced tip losses.

SUMMARY

A rotor structure comprises a rotor spindle and an annular row of radially-extending blade carried by the rotor spindle. Coupling members are located between adjacent blades and towards the end of the blades thereby to couple adjacent blades together. The coupling members are affixed to adjacent blades with anchoring elements.

The coupling members are substantially block elements having opposite faces with substantially non-rightangular parallelogram faces.

The anchoring elements are pins which pass through a bore extending between opposite side faces of the block, the axis of the bore being parallel to the opposite non-rightangular parallelogram faces and being between the non-rightangular parallelogram faces.

Each block also contains two partial bores substantially parallel to the longer bore, each partial bore extending from a long side face of a non-rightangular parallelogram face. Each partial bore is in one non-rightangular parallelogram face and opens into the non-rightangular parallelogram face and is located at a junction of the sides forming an acute angle for the parallelogram.

At least one block in the series for location between adjacent blades includes a partial bore with a complete bore running through the block parallel to the centrally-located bore.

The advantage of the structure is that it provides for a continuously coupled blading structure which is difficult to excite. Moreover, the block provides for mechanical coupling of the tips or ends of the blade and thereby produces a high damping which is not existent in a free-standing blade design. The tip coupling structure provides for easy disassembly of the blading structure to allow for blade removal and repair.

The invention is now further described with reference to the accompanying drawings.

DRAWINGS

These and other features, aspects, and advantages of the present invention will become better understood with reference to the following description, appended claims, and accompanying drawings where:

FIG. 2 is a partial end view showing the end portion of the blade structure with apertures through the end, in adjacency with the stator of a turbine.

FIG. 3 is a different partial front view of the end of a different blade with apertures in the end, and in adjacency with the stator.

FIG. 4 is a sectional side view of the end of two blades with a coupling block between them and a pin connecting adjacent blades and the block.

DESCRIPTION OF THE INVENTION

Figure 1:
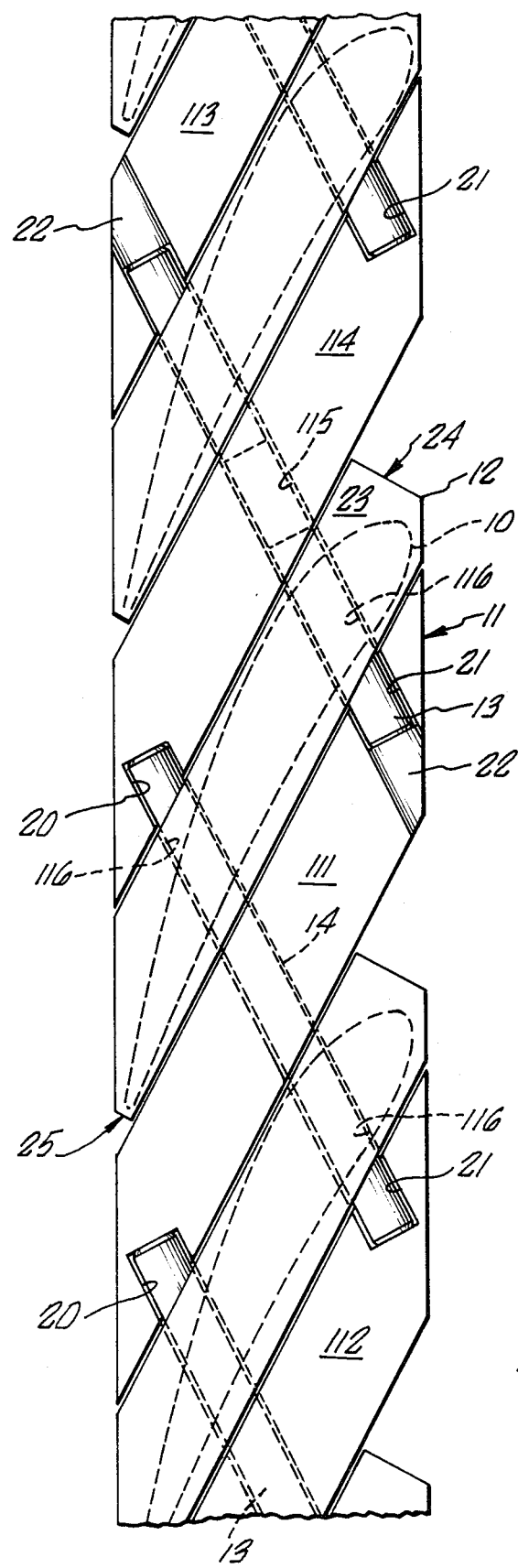
FIG. 1 is a partial elevational side view of a rotor structure showing the ends of the blades, with coupling blocks located between the blades and anchored to the blade ends.

A rotor structure for an axial flow elastic fluid utilizing machine such a turbine or compressor comprises a rotor spindle and an annular row of radially-extending blades 10 carried by the rotor spindle. Coupling members in the form of block elements 11 are located between adjacent blades 10 towards the ends or tips 12 of the blades 10 thereby to couple adjacent blades 10 together. Anchoring elements in the form of pins 13 affix adjacent blades 10 with the coupling blocks 11. The pins 13 pass through a bore 14 in the coupling block 11.

The blocks 11 have a set of opposite faces 15 and 16 which are substantially of a non-rightangular parallelogram shape.

The bore 14 extends between opposite longer side faces 17 and 18. The axis of the bore 14 is parallel to the opposite non-rightangular parallelogram faces 15 and 16 and is between the parallel faces 15 and 16.

The block 11 has two side faces of the non-rightangular parallelogram faces 15 and 16; namely sides 17 and 18 longer than two adjacent sides 118 and 19 of the non-rightangular parallelogram faces 15 and 16. The bore 14 extends between the longer faces 17 and 18 and is centrally located between the parallel faces 15 and 16.

Figure 5:
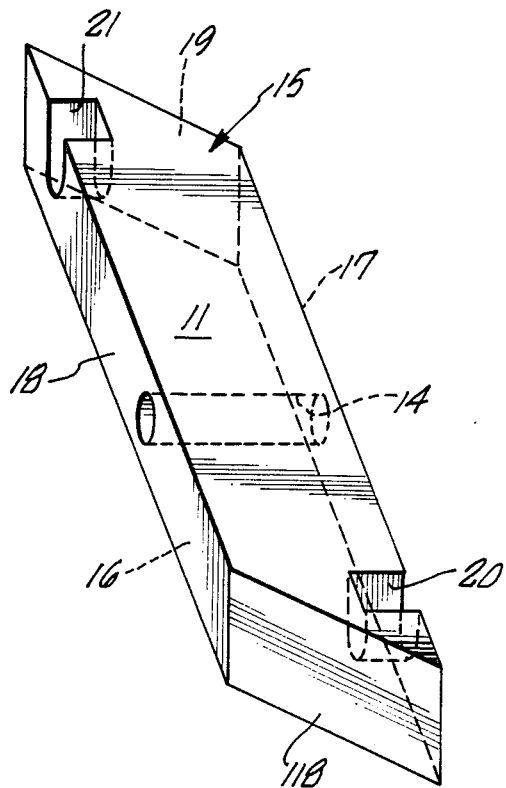
FIG. 5 is a perspective view of one form of the coupling block.

Additionally, there are two partial bores 20 and 21 each parallel to the longer bore 14. Each of the bores 20 and 21 extend from one of the longer faces 17 and 18 of the non-rightangular parallelogram faces 15 and 16. Bore 20 extends from side 17 and bore 21 from side 18. The partial bores 20 and 21 are located in one of the faces 15 or 16, of the non-rightangular parallelogram faces. In FIG. 5, the bores 20 and 21 open into face 15. The location of the bore 20 is at the acute angle junction between face 118 and face 17, and the bore 21 is in a location adjacent the acute angle between side faces 18 and 19.

Figure 6:
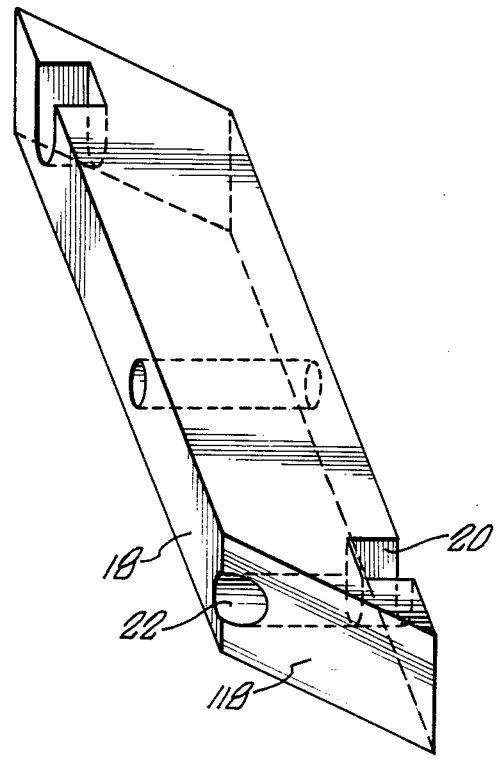
FIG. 6 is a perspective view of a second form of the coupling block.
Figure 7:
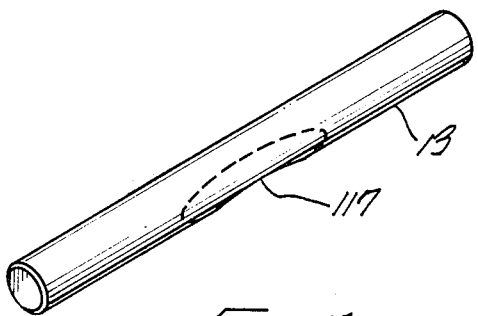
FIG. 7 is a perspective view of the anchoring pin.

Some of the blocks 11, namely the block illustrated in FIG. 6, includes an additional structure. The bore 20 additionally includes a completely extended bore 22 which passes through the part of face 18 and part of face 118. This block constitutes two of the blocks in the continuously coupled blading structure and its need will be further described below.

The blades 10 can use any of the various type of blade roots, for instance, axially entry serrated, curved, straight, or skewed, radially entry finger type or circumferential groove claw or tee type. The tips or ends of the blade 12 have a substantially parallelogram cross section 23 with the acute angular section being cut off at acute ends 24 and 25 respectively.

The blade tips are approximately ½" to ¾" deep and blend into the blade tip foil shape.

One or more wire structures or lugs may be used, depending on the length and duty of the blading to secure the blading structure effectively in the rotor structure. A wire can pass through a tangential hole 26 in the blade foil 10, as illustrated in FIG. 3. The illustration of FIG. 3 shows a blade tip or end 12 has a conical end-wise cross section.

In FIG. 2, lashing lug 27 is provided in the blade foil 10. In FIG. 2 the tip has a cylindrical endwise cross section 12.

In axial flow turbines there is an increasing pitch as the diametral location is increased and a spoke-effect is created on long blades 10. This makes an integral cover difficult to manufacture and stresses in the cover can become excessive. The non-rightangular parallelogram-shaped coupling block 11 between the tip ends 12 achieve the benefits of continuous coupling without the aforesaid disadvantages.

As indicated in FIG. 1 the pin 13 which is shown in full view and is the lower of the two full view pins 13 in FIG. 1, anchors block 111 with coupling blocks 112 and 114. The pin 13 is relatively diagonally located and engages the leading end (admissions side) of the one blade 12 and the trailing end (discharge side) of the adjacent blade 12. The coupling blocks 112 and 114 are identical in that they have the partial bores 20 and 21 as illustrated in FIG. 5. Block 111 and block 113, namely the first block in the series and next to last block in the series have the block structure illustrated in FIG. 6, namely with through bores 22.

The blades 10 and wires (if any) are installed to produce the desired continuous tie arrangement for the wire part of the rotor structure. The coupling blocks 11 are installed from a smaller diameter, lifted radially outward, and when the bore 14 in the block lines up with holes 116 in blade tips 12, the lacing pin 13 is inserted. In order to produce a bore-hole line-up, the blades 10 being engaged may require the application of a slight untwisting torque. The first block 111 installed should have the trailing end partial bore 20 drilled through as bore 20. The purpose of the bore 20 is discussed below in relation to disassembly. After the lacing pin 13 is installed and the untwisting torque is relieved, the pin 13 will resist movement, but can be tapped slightly to properly engage the next block 116 to be installed. The next block 112 will be installed in the direction opposite rotation, as all pins will probably have to be installed from the admission (inlet) side of the blading. The blocks 11 are slotted radially outward, so they can be slipped into place, engaging the end of the previously installed lacing pin 13. Again, a slight torsion is applied to the two blades 10 to be linked and when the blade tip holes 116 and coupling block bores 14 line up, the lacing pin 13, is installed to where it bottoms on the partial bores 20 and 21 in the adjacent coupling block 10.

This procedure is continued until all but the last and next-to-last coupling blocks 10 have been installed. Since all of the blocks 11 are standard, as illustrated in FIG. 5, a through bore 22 is drilled in the leading end partial bore 21 and then the next-to-last coupling block 113 is installed.

The last coupling block 114 may have to be modified to install and retain the last lacing pin 13. It does not have the pin capture features of the other blocks, and the last lacing pin 13 could rattle out during operation, if not positively retained. Various means 115 exist to retain the last pin 13, such as installing stopper pins at the holes 22 to prevent the lacing pin 13 from drifting out. Another method is to use a closing lacing pin 18 with a flat 117 in the center and then dent the underside of the block 114 at the hole to prevent the pin 13 from drifting out. A different method is to upset or stake the bore 22 through which the pin 13 is installed, so that it cannot back out. The best method will depend on the specific features of the blading being used, the type of root used and whether blade 10 removal without lifting the cover, is a feature of the design. For any such designs, a threaded hole in the end of the pin is desirable, to aid in removal of the last pin. The other pins can be removed by applying the required untwisting torque, and prying the pins back at the slotted blind holes.

Disassembly is accomplished by starting at the last or closing coupling block 114. Disassembly can actually be performed at any block 11 by drilling or milling out the end of the partial bore 20 or 21 so that the lacing pin 13 can be removed. Assuming that disassembly begins at the normal closing coupling block 114, the last lacing pin is extracted by removing any stopper pins and drifting the pin 13 from the block 114 toward the inlet (admission) side. The closing or last coupling block 114 is then removed. After this has been done, each successive lacing pin 13 is removed by applying torque to the blades 10 and prying the pin 13 back from the slotted bore 14, proceeding in the direction of rotation.

Pitch variations can be accommodated by flexure of the blades 10. Blades 10 employing welded lugs 27 should not be welded until the tip structure 12 has been assembled. Liners or shims can be used with the blocks 11, and should have the same cross-sectional shape as the tangential diagonal ends, engaging two pins 13 each.

The closing pin 13 can also be removed by drilling a hole into the leading end partial bore and then driving the pin 13 out either end. This approach is particularly useful if the closing pin 13 is retained by upsetting the end of the bore, or by denting the lower side of the coupling block 114 into a flat 117 machined into the pin 13. Because of the high ductility of titanium, such upset parts are usually reusable.

Proposed applications of this invention include the Wilson line region of the turbine (i.e., wet-dry operation) which tends to have corrosion problems such as stress corrosion cracking and corrosion fatigue, and also have high centrifugal stress and high vibratory stress. This makes titanium particularly attractive for the blade and block components. In particular, an alloy such as titanium alloy Ti6-4 should be useful.

The invention has been illustrated and described with reference to a particular embodiment. Different modifications are possible, falling within the scope of the following claims which should be considered as defining the scope of the invention.

I claim:

1. A rotor structure for an axial flow elastic fluid utilizing machine, comprising:
   (a) a rotor spindle;
   (b) an annular row of radially-extending blades carried by the rotor spindle there being bores through the blades towards the blade tips;
   (c) coupling members located between adjacent blades and in mating relationship towards the ends of the blades thereby to couple adjacent blades together the coupling member being a substantially block element and having a bore extending between a set of opposite faces; and
   pin anchoring elements for affixing adjacent blades with the coupling members, the pin extending through the bores in the block and blade.

2. A rotor structure as claimed in claim 1, wherein the block element provides one set of opposite substantially non-rightangular parallelogram faces.

3. A rotor structure as claimed in claim 2, wherein the bore extends between a set of opposite non-rightangular parallelogram faces of the block.

4. A rotor structure as claimed in claim 3, wherein the block includes side faces between each non-rightangular parallelogram face, the side faces having opposite side faces relatively longer than two adjacent side faces and the bore extends between the longer side faces.

5. A rotor structure as claimed in claim 4, wherein the bore is substantially centrally located between the non-rightangular parallelogram faces.

6. A rotor structure as claimed in any one of claims 1, 2 or 3 wherein adjacent blades are coupled to form a completely coupled blade structure.

7. A rotor structure as claimed in any one of claims 1, 2 or 3 wherein adjacent blades are coupled to form discrete groups of coupled blade structures.

8. A rotor structure as claimed in any one of claims 1, 2 or 3 wherein the pins are directed in a substantially tangential direction relative the rotor rotational axis.

9. A rotor structure as claimed in any one of claims 1, 2 or 3 wherein the pins are relatively freely movable in the bores of the blocks when the rotor is operating in its operational speed.

10. A rotor structure for an axial flow elastic fluid utilizing machine, comprising:
   (a) a rotor spindle;
   (b) an annular row of radially-extending blades carried by the rotor spindle;
   (c) coupling members located between adjacent blades and towards the ends of the blades thereby to couple the adjacent blades together, wherein the coupling members are substantially block elements, the block elements providing one set of opposite substantially non-rectangular parallelogram faces; and
   (d) pin anchoring elements for fixing adjacent blades with the coupling elements and wherein the blocks include a bore for the pins, the bore extending between a set of opposite non-rectangular parallelogram faces, and the blocks include side faces between each non-rectangular parallelogram face, the side faces having opposite side faces relatively longer than two adjacent side faces and the bore extends between the longer side faces, the bore being substantially centrally located between the non-rectangular parallelogram, and including two partial bores substantially parallel to the bore extending between the longer side faces, each partial bore extending from one longer side face of the non-rectangular parallelogram face and each partial bore being located in a different parallelogram face and opening into said face, the partial bores being located towards the junction of the non-rectangular parallelogram adjacent sides forming an acute angle.

11. A rotor structure as claimed in claim 10, wherein at least one of the partial bores includes a bore portion extending between opposite side faces.

12. A rotor structure as claimed in anyone of claims 10 or 11, wherein adjacent blades are coupled to form a completely coupled blade structure.

13. A rotor structure as claimed in anyone of claims 10 or 11, wherein adjacent blades are coupled to form discreet groups of coupled blade structures.

14. A coupling member for a rotor structure for an axial flow elastic fluid utilizing machine having a rotor spindle; and an annular row of radially-extending blades carried by the rotor spindle; the coupling member comprising faces being for mating location between adjacent blades and towards the ends of the blades thereby to couple adjacent blades together and being adapted to receive anchoring elements for affixing adjacent blades with the coupling member, wherein the member faces form substantially a block element, and wherein the anchoring elements are pins and the block includes a bore for the pins, the bore extending between a set of opposite faces.

15. A coupling member as claimed in claim 14, wherein the block element provides one set of opposite substantially non-rightangular parallelogram faces.

16. A coupling member as claimed in claim 15, wherein the axis of the bore is parallel to the opposite non-rightangular parallelogram faces.

17. A coupling member as claimed in claim 16, wherein the block includes side faces between each non-rightangular parallelogram face and including two opposite side faces.

18. A coupling member for a rotor structure for an axial flow elastic fluid utilizing machine having a rotor spindle; and an annual row of radially-extending blades carried by the rotor spindle; the coupling member comprising faces being for mating location between adjacent blades and towards the ends of the blades thereby to couple adjacent blades together and being adapted to receive anchoring elements for fixing adjacent blades with the coupling member, the member faces forming substantially a block element wherein the block element provides one set of opposite non-rectangular parallelogram faces, and wherein the anchoring elements are pins and the block includes a bore for the pins, the bore extending between a set of opposite faces, and the axis of the bore being parallel to the opposite non-rectangular parallelogram faces, the block including side faces between each non-rectangular parallelogram face and having two opposite side faces and including two partial bores substantially parallel to the bore extending between the longer side faces, each partial bore extending from one longer side face of the non-rectangular parallelogram face and each partial bore being located in a different parallelogram face and opening into said face, the bore being located towards the junction of the non-rectangular parallelogram adjacent sides forming an acute angle.

19. A coupling member as claimed in claim 18, wherein the bore is substantially centrally located between the non-rightangular parallelogram faces.

20. A coupling member as claimed in claim 18, wherein at least one of the partial bores includes a bore portion extending between opposite side faces.

21. A method of assembling a rotor structure for an axial flow elastic fluid utilizing machine having a rotor spindle for receiving and carrying an annual row of radially-extending blades comprising locating a first blade in location of the spindle, locating a coupling member between the first blade and a second adjacent blade, the coupling member being located towards the ends of the adjacent blades in mating relationship thereby to couple adjacent blades together; anchoring adjacent blades with the coupling member by inserting pins through mating bores in the blades and coupling members, and repeating the sequential blade and coupling member location and anchoring.

22. A method of assembling a rotor structure for an axial flow elastic fluid utilizing machine having a rotor spindle for receiving and carrying an annular row of radially-extending blades comprising locating a first blade in location on the spindle, locating a coupling member between the first blade and the second adjacent blade, the coupling member being located towards the ends of the adjacent blades in mating relationship thereby to couple adjacent blades together; anchoring adjacent blades with the coupling member; and repeating the sequential blade and coupling member location and anchoring, wherein the anchoring is effected by inserting pins through mating bores in the blades and the coupling members, and wherein a pin extends through a bore in a first coupling member and protrudes through bores in adjacent blades and into bores of coupling members on the sides of the blades remote from the first coupling member.

23. A method as claimed in claim 22, wherein adjacent blades and coupling members are sequentially coupled to form a completely coupled blade structure.

24. A method as claimed in claim 22, wherein adjacent blades and coupling members are coupled to form discreet groups of coupled blade structures.

25. A method as claimed in anyone of claims 23 or 24, wherein the rotor structure is selectively disassembled by reversing the assembly procedure.

26. A rotor structure for an axial flow elastic fluid utilizing machine comprising:
  (a) a rotor spindle;
  (b) an annular row of radially-extending blades carried by the rotor spindle;
  (c) coupling members located between adjacent blades and towards the ends of the blades in mating relationship thereby to couple adjacent blades together;
  (d) mating bores in the blades and the coupling members; and
  (e) anchoring pins for affixing adjacent blades with the coupling members whereby the pins protrude through bores in adjacent blades and into bores in the coupling members adjacent the blades.

27. A rotor structure as claimed in claim 26 including adjacent blades coupled to form a completely coupled blade structure.

28. A rotor structure as claimed in claim 27 including adjacent blades coupled to form discrete groups of coupled blade structures.

29. A coupling member for a rotor structure for an axial flow elastic fluid utilizing machine having a rotor spindle; and an annular row or radially-extending blades carried by the rotor spindle; the coupling member having faces and at least one bore through the member and another bore at least partially through the member being for location in mating location towards the end of adjacent blades thereby to couple adjacent blades together, the member being adapted to receive anchoring pins inserted through mating bores in the blades for affixing adjacent blades with the member, the pins extending through the bore in the member and protruding through bores in adjacent blades and into bores of members on the adjacent remote sides of the blades.

30. A coupling member as claimed in claim 29 wherein the faces form substantially a block element.

* * * * *